United States Patent
Nakajima et al.

(10) Patent No.: US 7,551,825 B2
(45) Date of Patent: Jun. 23, 2009

(54) COLORED OPTICAL FIBER AND EVALUATION METHOD THEREOF

(75) Inventors: Yasuo Nakajima, Tokyo (JP); Kouji Mochizuki, Tokyo (JP); Hiroki Tanaka, Tokyo (JP); Tetsuo Sato, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/003,435

(22) Filed: Dec. 26, 2007

(65) Prior Publication Data

US 2008/0112676 A1 May 15, 2008

Related U.S. Application Data

(63) Continuation of application No. PCT/JP2007/059507, filed on May 8, 2007.

(30) Foreign Application Priority Data

Jun. 2, 2006 (JP) .............................. 2006-154879

(51) Int. Cl.
 *G02B 6/00* (2006.01)
(52) U.S. Cl. .................................... 385/128
(58) Field of Classification Search ........................ None
 See application file for complete search history.

(56) References Cited

U.S. PATENT DOCUMENTS 4,334,733 A * 6/1982 Takeshima et al. .......... 385/141
4,724,316 A * 2/1988 Morton ................... 250/227.14
4,801,186 A * 1/1989 Wagatsuma et al. ......... 385/128
6,579,618 B1 * 6/2003 Ishikawa et al. ............ 428/378
2004/0022510 A1 * 2/2004 Suzuki et al. ............... 385/128
2008/0112676 A1 5/2008 Nakajima et al.

FOREIGN PATENT DOCUMENTS

| JP | 03-029907 | 2/1991 |
| JP | 3-29907 | 2/1991 |
| JP | 2001-240433 | 9/2001 |

OTHER PUBLICATIONS

U.S. Appl. No. 12/235,123, filed Sep. 22, 2008, Nakajima, et al.

* cited by examiner

*Primary Examiner*—Sung H Pak
*Assistant Examiner*—Mike Stahl
(74) *Attorney, Agent, or Firm*—Oblon, Spivak, McClelland, Maier & Neustadt, P.C.

(57) ABSTRACT

A colored optical fiber whose transmission loss hardly increases even in a high humidity condition or water-immersed condition is provided. The colored optical fiber according to the present invention is a colored optical fiber having a colored coating layer on a circumference of an optical fiber having at least two coating layers on a circumference of a glass optical fiber, characterized in that a difference in each amount of thermal expansion in an outer diameter direction between the optical fiber and a coating layer obtained by removing the glass optical fiber from the optical fiber in a temperature range from −100° C. to 100° C. is 1.8 µm or less.

6 Claims, 1 Drawing Sheet

COLORED OPTICAL FIBER AND EVALUATION METHOD THEREOF

CROSS REFERENCE TO RELATED APPLICATIONS

This application is a continuation of PCT/JP07/59507 filed on May 8, 2007, which claims priority to Japanese Patent Application No. 2006-154879 filed on Jun. 2, 2006. The entire contents of both of these documents being incorporated herein by reference.

TECHNICAL FIELD

The present invention relates to a colored optical fiber (so-called colored optical fiber which has a colored resin coating) accommodated in an optical fiber cable. More particularly, the present invention relates to a colored optical fiber which suppresses an increase in transmission loss of a colored optical fiber due to its operating environment and aged deterioration, and more particularly, to a colored optical fiber, transmission loss of which hardly increases and which has excellent water resistance even when immersed in water for a long time.

BACKGROUND ART

In a drawing process of quartz glass when manufacturing an optical fiber, coating resin is immediately applied to its circumference to prevent a reduction in strength of the optical fiber. UV curing resin is mainly used as coating resin for an optical fiber. Urethane acrylate based resin or epoxy acrylate based resin is used as UV curing resin.

In an optical fiber, transmission loss increases due to various external stress and microbending caused thereby. Therefore, to protect the optical fiber from such external stress, an optical fiber is generally coated in a two-layer structure. Resin having a relatively low Young's modulus is used for an inner layer which contacts the quartz glass as a buffer layer (hereinafter referred to as a "primary layer") and resin having a relatively high Young's modulus is used for an outer layer as a protective layer (hereinafter referred to as a "secondary layer"). Resin having Young's modulus of 3 MPa or less is generally used for the primary layer and resin having Young's modulus of 500 MPa or more is used for the secondary layer.

An optical fiber is manufactured by coating a quartz glass optical fiber drawn by heating/melting a preform having quartz glass as the main ingredient in a drawing furnace with liquid UV curing resin using a coating die and then irradiating this optical fiber with UV rays, causing the UV curing resin to cure and thereby coating it with the primary and secondary layers. By further coating the circumference of the optical fiber obtained with a coating layer made of colored resin or the like, a colored optical fiber is manufactured. FIG. 1 shows the structure of the colored optical fiber. In the present specification, suppose such a glass optical fiber coated with a primary layer and a secondary layer is referred to as an "optical fiber", the optical fiber, the circumference of which is further coated with a colored coating layer made of colored resin or the like is referred to as a "colored optical fiber" and a plurality of colored optical fiber arranged in parallel and collectively coated with ribbon resin is referred to as an "optical fiber ribbon." Furthermore, suppose a glass optical fiber having a coating layer on its circumference, that is, an optical fiber and colored optical fiber is collectively referred to as a "coated optical fiber."

In order to make a high reliability optical fiber which prevents an increase of transmission loss even when used by being immersed in water, there are various proposals such as to improve adhesion between the primary layer and glass optical fiber.

For example, according to Japanese Patent Application Laid-Open No. H03-29907, a fastening force which occurs at an interface between coating and glass due to a coefficient of contraction of the inner diameter of a protective layer and Young's modulus of the protective layer is restricted and an increase of transmission loss is reduced to obtain good transmission loss.

However, Patent Document 1 only discusses a correlation with an increase of transmission loss at a normal temperature and has given no consideration to further problems such as an increase of transmission loss when used in a wide range of temperature or when immersed in water.

With the remarkable widespread proliferation of optical fibers in recent years, the applicable range of optical fiber cables is considerably expanding. This means environments in which optical fiber cables are used become more and more diversified and long-term reliability required for optical fiber cables is becoming more and more stringent. For this reason, colored optical fiber and optical fiber ribbon are required whose transmission loss does not increase even when used immersed in water.

Under such circumstances, colored optical fiber whose transmission loss hardly increases even when exposed in a water-immersed condition are under study. However, there is a limit to handling the above described problems while achieving a balance of adhesion at the interface between layers and it is a current situation that colored optical fibers are put to practical use by combining a configuration to avoid water from reaching the colored optical fiber by considering a cable structure or the material of a cord or a sheath and a configuration to reduce the amount of water that reaches the colored optical fibers, and the reliability thereof is insufficient.

It is an object of the present invention to provide a colored optical fiber and an optical fiber ribbon whose transmission loss hardly increases even when used immersed in water.

It is another object of the present invention to provide a colored optical fiber evaluation method for measuring an amount of thermal expansion of an optical fiber and judging whether or not the colored optical fiber manufactured using the optical fiber has sufficient resistance to various operating environments.

SUMMARY OF THE INVENTION

In order to solve the above described problems, the colored optical fiber according to the present invention is a colored optical fiber characterized by having a colored coating layer on a circumference of an optical fiber having at least two coating layers on a circumference of a glass optical fiber, wherein a difference in an amount of thermal expansion in an outer diameter direction between the optical fiber and a coating layer obtained by removing the glass optical fiber from the optical fiber in a temperature range from −100° C. to 100° C. is 1.8 µm or less.

Furthermore, an optical fiber ribbon of the present invention is characterized by including a plurality of the optical fiber or colored optical fiber arranged in parallel and collectively coated with ribbon resin.

Furthermore, the colored optical fiber or optical fiber ribbon is characterized in that the coating layer, colored coating layer and ribbon resin are made of UV curing resin.

Furthermore, the method of evaluating a colored optical fiber is a method of evaluating a colored optical fiber having a colored coating layer on a circumference of an optical fiber having at least two coating layers on a circumference of a glass optical fiber, characterized by including a step of measuring an amount of thermal expansion of the optical fiber and a coating layer obtained by removing the glass optical fiber from the optical fiber in an outer diameter direction within a predetermined temperature range, a step of calculating a difference in each amount of thermal expansion between the optical fiber and the coating layer obtained with the glass optical fiber removed and a step of estimating an amount of increase in transmission loss caused by an operating environment of the colored optical fiber based on the difference in the respective calculated amounts of thermal expansion.

The method of evaluating a colored optical fiber according to the present invention is characterized by further including a step of judging, when a predetermined temperature range is from −100° C. to 100° C. and the calculated difference in the respective amounts of thermal expansion is 1.8 μm or less, that the amount of increase in transmission loss of the colored optical fiber caused by an operating environment is sufficiently small.

According to the colored optical fiber of the present invention, by using an optical fiber with a difference in the amount of thermal expansion in a temperature range of −100° C. to 100° C. set to 1.8 μm or less, it is possible to suppress delamination at an interface between a glass optical fiber and coating resin such as an interface between glass and primary layer which contributes to an increase of transmission loss.

Furthermore, according to the optical fiber ribbon of the present invention, it is possible to configure a suitable optical fiber ribbon by using the above described optical fiber or colored optical fiber.

Furthermore, according to the colored optical fiber evaluation method of the present invention, by comparing the amount of thermal expansion in the outer diameter direction of the optical fiber including a glass optical fiber with that of the coating layer with the glass optical fiber removed and calculating the difference in the amount of thermal expansion, it is possible to estimate an increase of transmission loss of the colored optical fiber using the optical fiber. Furthermore, when the temperature range is from −100 to 100° C. and the calculated difference in the respective amounts of thermal expansion of the optical fiber is 1.8 μm or less, it is possible to judge that the amount of increase in transmission loss of the colored optical fiber using the optical fiber caused by the operating environment is sufficiently small.

MAIN REFERENCE NUMERALS

Figure 1:
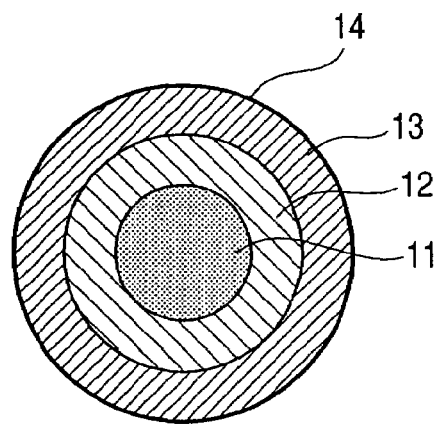
FIG. 1 is a traverse cross-sectional view of an optical fiber of the present invention.

11 Glass optical fiber
12 Primary layer
13 Secondary layer
14 Optical fiber
15 Colored optical fiber
21 Ribbon resin
22 Optical fiber ribbon

EMBODIMENTS OF THE INVENTION

As a result of a meticulous study on the cause of an increase of transmission loss of a coated optical fiber exposed in a water-immersed condition, the present inventors have discovered that peeling at the interface between the glass optical fiber and primary layer, that is, delamination is observed in a colored optical fiber whose transmission loss has increased. The present inventors have also discovered that delamination is observed at the interface between the secondary layer and colored layer or interface between the colored layer and ribbon layer.

Delamination between different layers occur when a force to peel the coating layer at the interface between the glass optical fiber and coating layer exceeds an adhesive force at the interface between the glass optical fiber and coating layer. When delamination occurs at the interface, the force applied to glass becomes nonuniform and produces microbending, which causes transmission loss to increase.

Thus, when the inventors examined in detail a method for measuring distortion occurring in the coating layer of the colored optical fiber when used over a wide range of temperature or when immersed in water, the inventors discovered that it is possible to estimate distortion occurring in the coating layer of the colored optical fiber by measuring a variation in the outer diameter from a low to high temperature using a thermo mechanical analysis (TMA). That is, according to this measuring method, the amount of variation in the outer diameter of the optical fiber containing a glass optical fiber and the amount of variation in the outer diameter of a tube sample of only a coating layer resulting from pulling out the glass optical fiber from the optical fiber are measured and these amounts of variation in the outer diameter are compared. Applying TMA measurement to only the coating layer allows the thermal behavior inherent to the coating layer itself to be measured. On the contrary, when a glass optical fiber is included, the behavior inherent to the coating layer is constrained by adhesion between the primary layer and glass optical fiber. The inventors have completed the present invention by discovering that it is possible to measure distortion caused by the coating layer by comparing the amount of variation in the outer diameter when a glass optical fiber is included with the amount of variation in the outer diameter of only the coating layer without any glass optical fiber.

The preferable embodiments carrying out the present invention are as follows. That is, an optical fiber with a glass optical fiber coated with a primary layer and a secondary layer is manufactured and the optical fiber is coated with a colored layer to thereby manufacture a colored optical fiber. UV curing resin is used for resin that makes up each coating layer. A plurality of these colored optical fibers are arranged in parallel and collectively coated with ribbon resin made of UV curing resin and it is thereby possible to form an optical fiber ribbon.

UV curing resin used as coating resin or colored resin of the optical fiber is mainly composed of oligomer, diluted monomer, photoinitiator, chain transfer agent, silane coupling agent and various additives. As oligomer, urethane acrylate oligomer, epoxy acrylate oligomer or polyester acrylate oligomer is mainly used. As diluted monomer, monofunctional acrylate or multifunctional acrylate is used.

Furthermore, the difference in the amount of thermal expansion of the optical fiber can be controlled appropriately by changing a glass transition temperature of the material of the primary layer used for the optical fiber, glass transition temperature of the material of the secondary layer and thickness of the primary layer or the like. The difference in the amount of thermal expansion can be reduced by increasing the glass transition temperature of the primary material, reducing the glass transition temperature of the secondary material or reducing the thickness of the primary layer or the like, but since the glass transition temperature of the primary material is a normal temperature or less, it is realistic to perform control by adjusting the glass transition temperature of the secondary material or the thickness of the primary layer.

EXAMPLES

As an example of the present invention, as shown in FIG. 1, several types of an optical fiber 14 was manufactured using a glass optical fiber 11 made of quartz glass coated with two coating resin layers of a primary layer 12 and a secondary layer 13. UV curing resin was used for each resin. UV curing resin is composed of oligomer, diluted monomer, photoinitiator, chain transfer agent and additive, but several types of the optical fiber 14 were manufactured by changing the respective component materials.

In each example, an optical fiber including a glass optical fiber 11 made of quartz glass having an outer diameter of 125 μm, a primary layer 12 having an outer diameter of 185 μm or 195 μm and a secondary layer 13 having an outer diameter of 245 μm was manufactured, then coated with a colored layer in a separate process and a colored optical fiber having an outer diameter of 255 μm was obtained.

Figure 2:
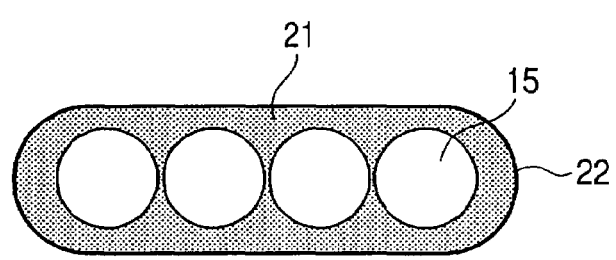
FIG. 2 is a traverse cross-sectional view of an optical fiber ribbon of the present invention.

Furthermore, as for some colored optical fibers 15, four of them were arranged in parallel two-dimensionally as shown in FIG. 2, collectively coated with ribbon resin 21 made of UV curing resin to form an optical fiber ribbon 22. The colored optical fiber and optical fiber ribbon in the comparative example shown in Table 1 were also created in the same way. The amount of thermal expansion of the optical fiber and transmission loss of the colored optical fiber were measured according to the following method. The results are shown in Table 1.

(Method of Measuring Amount of Thermal Expansion of Optical Fiber)

The amount of thermal expansion (μm) of the optical fiber was measured using a thermo mechanical analyzer (TMA40 manufactured by Mettler-Toledo International Inc.). The measuring conditions were as follows.

Figure 3:
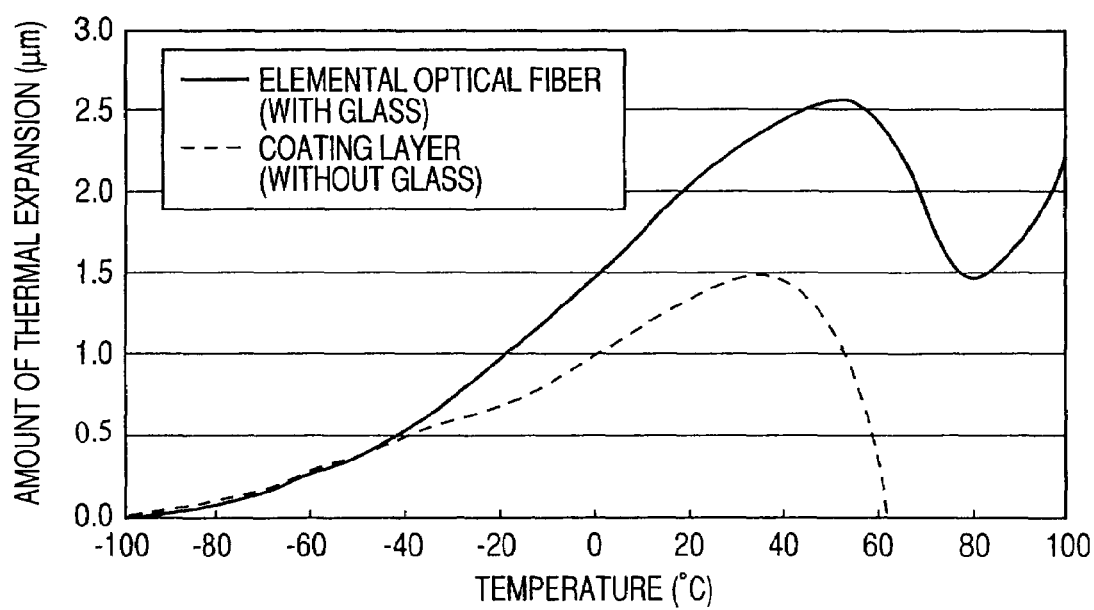
FIG. 3 is a diagram showing an amount of thermal expansion of the optical fiber based on a thermo mechanical analysis.

Measuring conditions: load added: 0, temperature range: −100 to 100° C., temperature rising speed 10° C./min A sample was created with only a tubular coating layer by peeling only the coating layer from the optical fiber. A variation in the outermost diameter was measured for both the optical fiber containing a glass fiber and a coating layer not containing any glass fiber. FIG. 3 shows a measurement example. The coating layer not containing any glass fiber is shown with a dotted line and the optical fiber containing glass is shown with a solid line. As is clear from FIG. 3, the outermost diameter of the coating layer and that of the optical fiber decreased drastically when the temperature exceeded 40° C. and 60° C. respectively. Here, the amount of thermal expansion was assumed to be the difference between the value of the outermost diameter at −100° C. and a maximum value of the outermost diameter over the entire temperature range (from −100° C. to 100° C.) for the optical fiber and coating layer respectively. In FIG. 3, the amount of thermal expansion of the optical fiber was approximately 2.6 μm and the amount of thermal expansion of the coating layer was approximately 1.5 μm. Furthermore, the difference in the amount of thermal expansion between the optical fiber and coating layer was approximately 1.1 μm in this case. The data shown in FIG. 3 is the data in Example 1 of Table 1 as shown below.

(Method of Measuring Transmission Loss)

An optical fiber or optical fiber ribbon of approximately 1 km long manufactured using the optical fiber whose amount of thermal expansion was measured was immersed in water heated to 60° C. and an increase in transmission loss 30 days later was measured. The increase in transmission loss was measured using an optical pulse tester MW9060A manufactured by Anritsu Corporation by measuring transmission loss of wavelength 1.55 μm in a longitudinal direction based on backward scattering loss coefficient of light (OTDR). When the increase in transmission loss after being immersed in 60° C. hot water for 30 days was recognized as 0.1 dB/km or more, resistance to the operating environment was judged to be insufficient (marked "x" in Table 1).

TABLE 1

|  | Example | | | | | Comparative example | | |
|---|---|---|---|---|---|---|---|---|
|  | 1 | 2 | 3 | 4 | 5 | 1 | 2 | 3 |
| Elastic modulus of primary layer (MPa) | 1.0 | 1.8 | 1.4 | 1.4 | 1.4 | 1.5 | 1.5 | 1.4 |
| Elastic modulus of secondary layer (MPa) | 500 | 850 | 850 | 760 | 760 | 690 | 690 | 930 |
| Outer diameter of primary layer (μm) | 185 | 195 | 195 | 195 | 195 | 195 | 195 | 195 |
| Glass transition temperature of primary coating resin (° C.) | −17 | −38 | −5 | −5 | −5 | −20 | −20 | −5 |
| Glass transition temperature of secondary coating resin (° C.) | 87 | 78 | 84 | 92 | 92 | 102 | 102 | 119 |
| Difference in thermal expansion in elemental wire (μm) | 1.1 | 1.0 | 1.3 | 1.6 | 1.6 | 1.9 | 1.9 | 2.0 |
| Condition during measurement of increase in transmission loss | Optical fiber ribbon | Optical fiber ribbon | Optical fiber ribbon | Colored optical fiber | Optical fiber ribbon | Colored optical fiber | Optical fiber ribbon | Optical fiber ribbon |

TABLE 1-continued

|  | Example | | | | | Comparative example | | |
| --- | --- | --- | --- | --- | --- | --- | --- | --- |
|  | 1 | 2 | 3 | 4 | 5 | 1 | 2 | 3 |
| Increase in transmission loss (dB/km) after 60° C. × 30 days, 1.55 μm | 0.0 | 0.0 | 0.0 | 0.0 | 0.0 | 0.2 | 0.4 | 0.3 |
| Judgment | ○ | ○ | ○ | ○ | ○ | X | X | X |

As is clear from the above described explanations, according to the colored optical fiber of the present invention, when a comparison was made between the amount of thermal expansion of the optical fiber at −100 to 100° C. and the amount of thermal expansion of the coating layer obtained by removing a glass optical fiber from the optical fiber at −100 to 100° C., an optical fiber having a difference in the amount of thermal expansion of 1.8 μm or less was used and it was thereby possible to confirm that transmission loss would not increase even when it was immersed in 60° C. hot water for 30 days.

Furthermore, this effect could be confirmed with the condition of the colored optical fiber (Example 4 in Table 1) as well as the condition of the optical fiber ribbon (Examples 1, 2, 3, 5).

On the other hand, it was confirmed from the measurement results of comparative examples 1 to 3 that the increase in transmission loss was 0.1 dB/km or more when the difference in the amount of thermal expansion was 1.9 μm or more.

A single mode fiber having a normal step index type refractive index profile was used in this example, but it is obvious for those skilled in the art that the present invention is also applicable to optical fibers having other profiles.

Furthermore, according to the colored optical fiber evaluation method of the present invention, the temperature range for measuring the amount of thermal expansion is not limited to −100° C. to +100° C. Since the outer diameter of the coating layer varies considerably in the vicinity of a transition point of glass of the coating layer, it is preferable to set it within a range including all glass transition points of the coating layer and set it so that the maximum value shown in FIG. 3 can be observed. The amount of thermal expansion in this case is defined as the difference between the value of the outermost diameter at a minimum temperature within the measurement temperature range and the maximum value of the outermost diameter within the measurement temperature range.

As described above, according to the present invention, it is possible to obtain an colored optical fiber and optical fiber ribbon whose transmission loss hardly increases even when immersed in water.

This application claims priority from Japanese Patent Application No. 2006-154879 filed Jun. 2, 2006, which are hereby incorporated by reference herein.

The invention claimed is:

1. An optical fiber comprising at least two coating layers on a circumference of a glass optical fiber,
   wherein a difference in an amount of thermal expansion in an outer diameter direction between the optical fiber and a coating layer obtained by removing the glass optical fiber from the optical fiber in a temperature range from −100° C. to 100° C. is 1.8 μm or less.

2. The optical fiber according to claim 1, wherein the coating layer is made of UV curing resin.

3. A colored optical fiber comprising the optical fiber according to claim 1 which has a colored coating layer on a circumference of the optical fiber.

4. The colored optical fiber according to claim 3, wherein the colored coating layer is made of UV curing resin.

5. An optical fiber ribbon comprising a plurality of the colored optical fiber according to claim 3 arranged in parallel and collectively coated with ribbon resin.

6. The optical fiber ribbon according to claim 5, wherein the ribbon resin is made of UV curing resin.

* * * * *